United States Patent [19]
Goulder

[11] 3,761,008
[45] Sept. 25, 1973

[54] EXPANSION ARBOR

[75] Inventor: Roy C. Goulder, Sun City, Ark.

[73] Assignee: Detroit Sales Co., Ferndale, Mich.

[22] Filed: Oct. 21, 1971

[21] Appl. No.: 191,310

[52] U.S. Cl.......................... 279/2, 269/48.1, 29/117
[51] Int. Cl............................................. B23b 31/40
[58] Field of Search........................... 279/2, 1 ME; 269/48.1; 29/117

[56] References Cited
UNITED STATES PATENTS

| 763,251 | 6/1940 | Breck................................. 29/117 |
| 2,226,078 | 12/1940 | Spahn..................................... 279/2 |
| 2,601,419 | 6/1952 | Spahn..................................... 279/2 |
| 2,817,532 | 12/1957 | Hohward et al........................ 279/2 |
| 2,996,301 | 8/1961 | Cox......................................... 279/2 |

*Primary Examiner*—Andrew R. Juhasz
*Assistant Examiner*—Z. R. Bilinsky
*Attorney*—Gerald E. McGlynn, Jr. et al.

[57] ABSTRACT

An arbor including a radially expandable and contractable collet carried by a pair of axially adjustable pressure applying members. The collet is formed with spaced, inclined end surfaces, each of which is formed with a series of scallops, or undulations having smoothly curved outwardly projecting lobes joined by smoothly curved, inwardly projecting troughs or recesses. Each of the pressure applying members has a pressure applying surface engaged with one of the end surfaces of the collet, and each of the pressure applying surfaces is complementally inclined with respect to the associated end surface of the collet, and is also formed with a series of complemental scallops, whereby movement of the pressure applying members toward each other applies radial pressure to the collet and secures the collet against rotation with respect to the pressure applying members.

6 Claims, 3 Drawing Figures

PATENTED SEP 25 1973
3,761,008
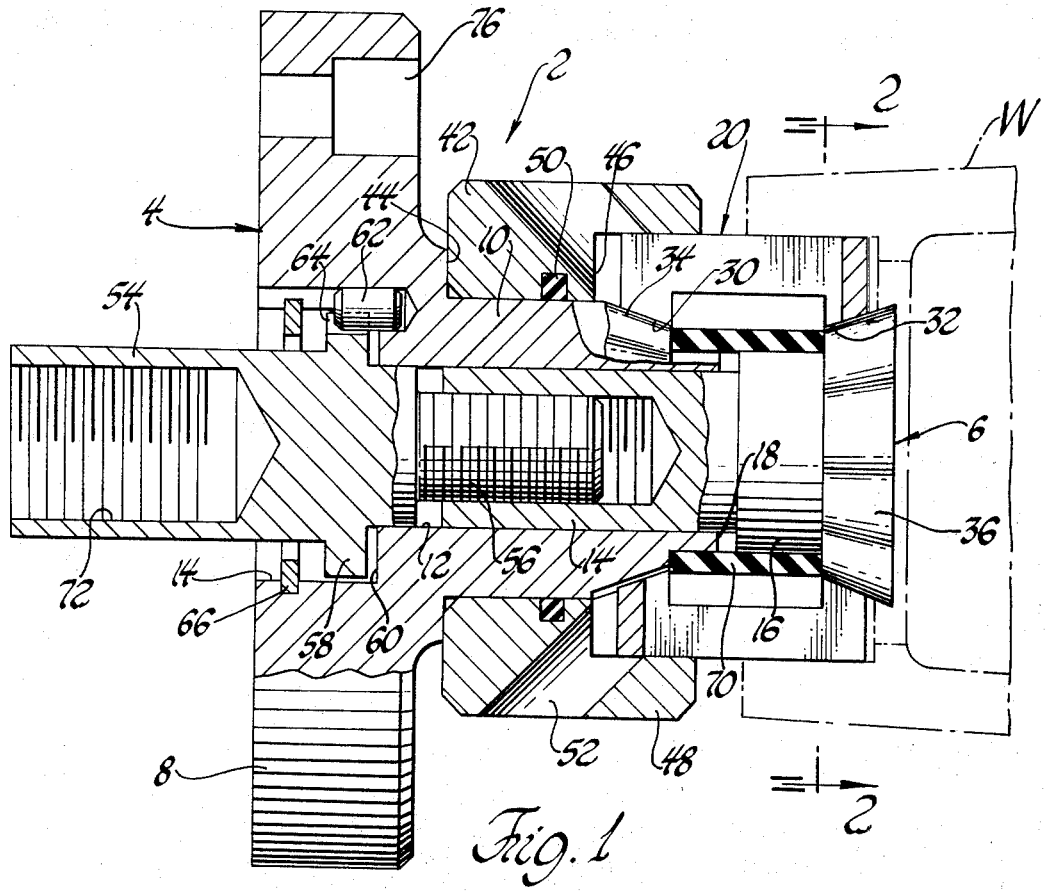
Fig. 1
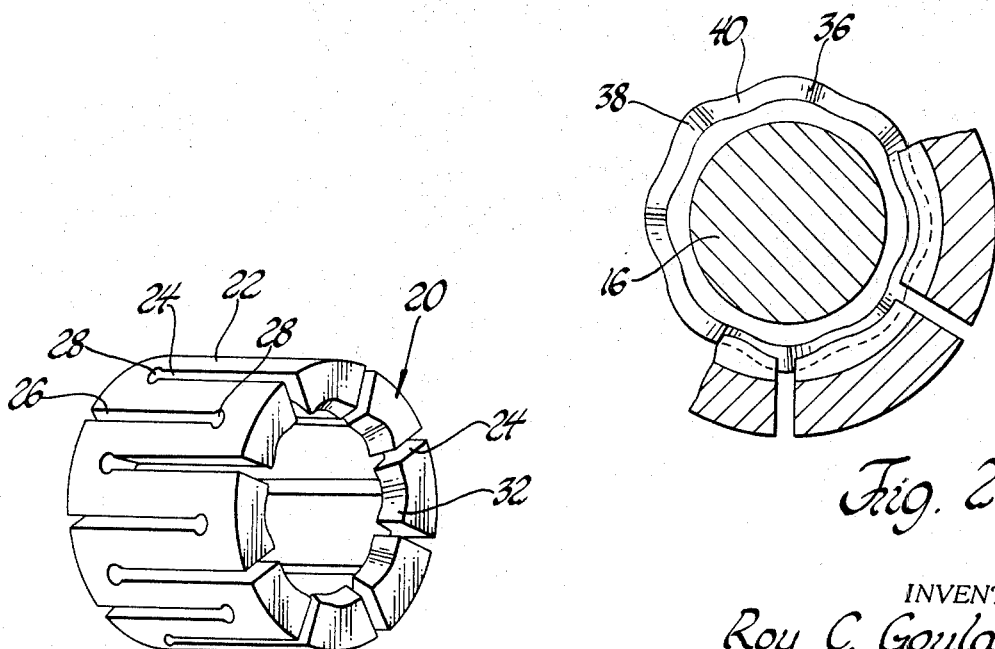
Fig. 3
Fig. 2
INVENTOR.
Roy C. Goulder
BY
McGlynn, Reising, Milton & Ethington
ATTORNEYS tured according to the present invention, the scallops include twelve equally spaced lobes or male scallops 38 and twelve equally spaced troughs or female scallops 40 with the distance between the low point of a female scallop 40 and the high point of the male scallop 38 being 0.009 inches.

An annular restricter 42 is mounted on the body 10 of the pressure applying member 4 and abuts a shoulder 44 formed on the pressure applying member 4. The restricter is formed with an enlarged recess 46 defining an annular projection 48 which receives one end of the collet 20 so that upon movement of the pressure applying members 4 and 6 toward each other to expand the collet 20, the expansion is concentrated at the right-hand end of the collet 20 as viewed in FIG. 1, that is, the end of the collet 20 which is in engagement with a workpiece W so that the expansion will be confined or concentrated at the workpiece. The restricter 42 is formed with an internal annular groove receiving an annular sealing member 50, and is also formed with openings 52 extending diagonally with respect to the axis of the arbor for receiving cooling liquid.

In order to move the pressure applying members 4 and 6 toward each other, a pulling member 54 is engaged with the pressure applying member 6 through a threaded shank portion 56 which is threadedly received in the cylindrical projection 14. The pulling member 54 includes a flange 58 which is received in the recess 14 and limits movement of the pressure applying member 6 toward the right by engagement with the shoulder 60 formed by the recess 14. rotation of the pulling member 54 with respect to the pressure applying member 4 is prevented by a pin 62 mounted in the pressure applying member 4 and projecting into a slot 64 formed on the flange 58. The pulling member 54 is prevented from being separated from the pressure applying member 4 by a snap ring 66.

A cylindrical sleeve 70 of rubber or similar material is mounted on the pressure applying members 4 and 6 between the pressure applying surfaces 34 and 36 to prevent the entry of dirt and foreign matter through the slots 24 and 26 of the collet 20. The pulling member 54 has an internally threaded bore 72 for engagement with a source of power to actuate the pulling member to move the pressure applying member 6 toward or away from the pressure applying member 4. Flange 8 of the pressure applying member 4 is provided with mounting openings 76.

In operation, the assembly 2 is engaged with the workpiece W by inserting the end of the collet 20 opposite the restricter 42 into an opening of the workpiece W with the pressure applying members 4 and 6 in a relaxed or separated condition. When the collet 20 is inserted into the workpiece, the pulling member 54 is actuated to move the pressure applying member 6 toward the pressure applying member 4 to cause expansion of the collet 20 into engagement with the workpiece W so that a cutting or grinding operation can be formed on the workpiece W while it is rotated by the power equipment supporting the arbor assembly 2. The scalloped configuration of the pressure applying surfaces 34 and 36 as well as the complementally scalloped end sur-faces 30 and 32 of the collet 20 prevent the collet from slipping with respect to the pressure applying members 4 and 6 during operation.

While a specific embodiment of the invention has been disclosed in the accompanying drawings and described in the foregoing specification, it should be understood that the invention is not limited to the exact construction shown. Alterations in the construction and arrangement of parts, all falling within the scope and spirit of the invention, will be apparent to those skilled in the art.

I claim:

1. An arbor comprising: pressure applying means; a radially expandable and contractable collet carried by said pressure applying means; said collet having at least one inclined end surface formed with a series of scallops; said pressure applying means having a pressure applying surface engageable with said end surface of said collet, said pressure applying surface being complementally inclined with respect to said end surface of said collet and being formed with a complemental series of scallops; and said pressure applying means being operable to cause said pressure applying surface of said pressure applying means to move axially with respect to said end surface of said collet and thereby apply radial pressure to said collet.

2. A arbor as claimed in claim 1 wherein said pressure applying means comprises a pair of pressure applying members secured together for limited axial movement with respect to each other, said pressure applying surface being formed on one of said members.

3. An arbor as claimed in claim 2 wherein said members project concentrically through said collet and are movable axially toward each other to cause said pressure applying surface to expand said collet, and are movable axially away from each other to permit said collet to contract from the expanded condition.

4. An arbor as claimed in claim 3 further including a restrictor mounted on the other of said pressure applying members and receiving the end of said collet opposite said one end surface to confine a portion of said collet and limit expansion of said collet to the unconfined portion thereof.

5. An arbor comprising: a pair of pressure applying members secured together for axial movement with respect to each other; a radially expandable and contractable collet carried by said pressure applying members, said collet having a pair of spaced, inclined end surfaces each formed with a series of scallops; each of said pressure applying members having a pressure applying surface engaged with one of said end surfaces, each of said pressure applying surfaces being complementally inclined with respect to its associated end surface and being formed with a series of complemental scallops whereby movement of said pressure applying members toward each other applies radial pressure to said collet.

6. An arbor as claimed in claim 5 wherein said end surfaces are formed internally on said collet such that movement of said pressure applying members toward each other causes expansion of said collet.

* * * * *

EXPANSION ARBOR

This invention relates generally to arbors for supporting a rotating tool or workpiece, and is particularly concerned with arbors of the type using expandable and contractable collets.

Presently available arbors utilizing expandable and contractable collets generally are of the type wherein the collet has inclined end surfaces. The collet is mounted on an expanding device having a pair of pressure applying members, each of which has a pressure applying surface engageable with one of the inclined end surfaces of the collet. The pressure applying members are movable toward and away from each other, and movement of the pressure applying members toward each other causes radial pressure to be applied to the collet by the interaction of the pressure applying surfaces with the end surfaces of the collet.

In some prior art devices of this type, complemental flat surfaces are provided on the pressure applying surfaces and the collet end surfaces to provide high resistance to rotation of the collet with respect to the pressure applying members (see U.S. Pat. No. 2,817,532). It is difficult and expensive to accurately machine the complemental flat surfaces on the coacting collet and pressure applying members. It is also sometimes difficult to locate the collet on the pressure applying members and properly mate the respective flat surfaces. Further, after repeated use, or because of the high torques frequently encountered, the corners of the flat surfaces may become worn, and slippage may occur between the collet and the pressure applying members during rotation of a workpiece.

A object of this invention is to provide an arbor having a pair of relatively movable pressure applying members for engagement with an expandable and contractable collet wherein the end surfaces of the collet and the pressure applying surfaces of the pressure applying members have a configuration that will prevent slippage from occurring between the collet and the pressure applying members.

A Further object is to provide an arbor utilizing a radially expandable and contractable collet wherein the collet has inclined end surfaces engageable with complementally inclined pressure applying surfaces and the coacting surfaces are formed with a series of scallops to prevent slippage between the collet and pressure applying surfaces during rotation of the arbor.

In carrying out the foregoing, and other objects, an arbor according to the present invention includes a pair of pressure applying members secured together for axial movement with respect to each other, and a radially expandable and contractable collet carried by the pressure applying members. The collet is formed with a pair of spaced, inclined end surfaces, each of which is formed with a series of scallops or undulations. Each of the pressure applying members is formed with a pressure applying surface engaged with one of the end surfaces of the collet, and each of the pressure applying surfaces is complementally inclined with respect to the associated collet end surface and is formed with a series of complemental scallops or undulations whereby movement of the pressure applying members toward each other to cause the scallops of the pressure applying members to mesh with or engage the scallops of the collet applies radial pressure to the collet, and the interengagement of the scallops of the collet end surface with the scallops of the pressure applying members prevents relative rotation between the collet and pressure applying members. The scallops permit the collet to be mounted on the pressure applying members without regard to the angular relationship between the collet and the rotary axis of the arbor.

Other objects, advantages and features of the invention will become apparent from the following description taken in connection with the accompanying drawings in which:

FIG. 1 is a sectional view of an arbor according to the present invention;

FIG. 2 is a sectional view taken on line 2—2 of FIG. 1; and

FIG. 3 is a perspective view of the collet used in the assembly of FIG. 1.

In FIG. 1, reference numeral 2 collectively designates an arbor assembly according to the present invention including a pair of pressure applying members or expanders 4 and 6 which are secured together for axial movement with respect to each other. The pressure applying member 4 includes a mounting flange 8 extending radially from one end of a cylindrical body 10. A axial bore 12 extends through the cylindrical body 10 and communicates with an enlarged concentric recess 14 at the left end of the body 10 as viewed in FIG. 1.

The pressure applying member 6 includes an internally threaded, cylindrical projection 14 which is slidably received in the axial bore 12. A enlarged collar 16 on one end of the cylindrical projection 14 is engageable with the end 18 of the cylindrical body 10 to provide a stop and limit the axial movement of the cylindrical projection 14 into the bore 12.

Reference numeral 20 designates a radially expandable and contractable collet carried by the pressure applying members 4 and 6. The collet 20 includes a relatively thin tubular body 22 formed with longitudinal slots 24 extending from one end of the collet and similar longitudinal slots 26 extending from the other end, the slots 24 and 26 being in alternating or staggered relationship with respect to each other. The slots 24 and 26 each extend only partway through the length of the body 22, and each terminates in a stress relieving hole 28.

The collet 20 is formed with a pair of spaced, inclined end surfaces 30 and 32. Each of the end surfaces 30 and 32 is formed with a series of scallops. The pressure applying members 4 and 6 are formed with pressure applying surfaces 34 and 36, respectively, which are respectively engaged with the inclined end surfaces 30 and 32 of the collet. Each of the pressure applying surfaces 34 and 36 are complementally inclined with respect to the associated end surfaces 30 and 32, and each is formed with a series of complemental scallops or undulations including alternating lobes or male scallops 38 and troughs, recesses or female scallops 40 as shown in FIG. 2. Consequently, movement of the pressure applying member 6 toward the pressure applying member 4 applies radial pressure to the collet 20 tending to expand the collet, and the interengagement of the scalloped end surfaces 30 and 32 of the collet 20 with the respective pressure applying surfaces 34 and 36 secures the collet to the pressure applying members against relative rotation with respect to the pressure applying members. The scallops on the coacting surfaces 30, 34 and 36, 32 are smoothly curved with no sharp edges or corners. In one specific construction manufac-